(12) United States Patent
Shin (10) Patent No.: US 9,336,630 B2
(45) Date of Patent: May 10, 2016

(54) METHOD AND APPARATUS FOR PROVIDING AUGMENTED REALITY

(71) Applicant: Hyundai Motor Company, Seoul (KR)

(72) Inventor: Dongsoo Shin, Gyeonggi-do (KR)

(73) Assignee: Hyundai Motor Company, Seoul (KP)

( * ) Notice: Subject to any disclaimer, the term of this patent is extended or adjusted under 35 U.S.C. 154(b) by 33 days.

(21) Appl. No.: 14/068,547

(22) Filed: Oct. 31, 2013

(65) Prior Publication Data

US 2014/0152697 A1    Jun. 5, 2014

(30) Foreign Application Priority Data

Dec. 5, 2012   (KR) .................. 10-2012-0140586

(51) Int. Cl.
| | |
|---|---|
| *G06T 15/00* | (2011.01) |
| *G06T 19/00* | (2011.01) |
| *G02B 27/01* | (2006.01) |
| *G06T 7/00* | (2006.01) |
| *G06T 7/40* | (2006.01) |

(52) U.S. Cl.
CPC .............. *G06T 19/006* (2013.01); *G02B 27/01* (2013.01); *G06T 7/0042* (2013.01); *G06T 7/403* (2013.01); *G02B 2027/014* (2013.01); *G06T 2207/20021* (2013.01); *G06T 2207/30248* (2013.01)

(58) Field of Classification Search
CPC ............................ G06T 19/006; G06T 19/00
USPC ........................................................ 345/633
See application file for complete search history.

(56) References Cited

U.S. PATENT DOCUMENTS

| | | | | |
|---|---|---|---|---|
| 2006/0262140 | A1* | 11/2006 | Kujawa et al. | 345/633 |
| 2010/0226535 | A1* | 9/2010 | Kimchi et al. | 382/103 |
| 2010/0253542 | A1* | 10/2010 | Seder et al. | 340/932.2 |
| 2012/0154441 | A1* | 6/2012 | Kim | 345/633 |
| 2012/0224062 | A1* | 9/2012 | Lacoste et al. | 348/148 |

FOREIGN PATENT DOCUMENTS

| | | |
|---|---|---|
| JP | 2010234959 A | 10/2010 |
| KR | 10-2009-0087807 | 8/2009 |

(Continued)

OTHER PUBLICATIONS

Raphael Grasset, Tobias Langlotz, Denis Kalkofen, Markus Tatzgern, Dieter Schmalstieg: Image-driven view management for augmented reality browsers. 177-186, 11th IEEE International Symposium on Mixed and Augmented Reality, ISMAR 2012, Atlanta, GA, USA, Nov. 5-8, 2012. IEEE Computer Society 2012, ISBN 978-1-4673-4660-3.*

(Continued)

*Primary Examiner* — Devona Faulk
*Assistant Examiner* — Jin Ge
(74) *Attorney, Agent, or Firm* — Mintz Levin Cohn Ferris Glovsky and Popeo, P.C.; Peter F. Corless (57) ABSTRACT

A method and apparatus for providing augmented reality are provided and include a controller that is configured to match a head up display area of a windshield and an input image and determine an area in which an information amount is a minimum in the matched image as a position of a display window to display virtual information. In addition, the controller is configured to output virtual information at the determined position.

8 Claims, 12 Drawing Sheets

(56) References Cited

FOREIGN PATENT DOCUMENTS

| KR | 10-2011-0002610 | 1/2011 |
| KR | 10-2011-0084748 | 7/2011 |
| KR | 10-2011-0104686 | 9/2011 |

OTHER PUBLICATIONS

Blaine Bell, Steven Feiner, Tobias Höllerer, View Management for Virtual and Augmented Reality, UIST 2001 (ACM Symp. on User Interface Software and Technology), Orlando, FL, Nov. 11-14, 2001, pp. 101-110.*

* cited by examiner

METHOD AND APPARATUS FOR PROVIDING AUGMENTED REALITY

CROSS-REFERENCE TO RELATED APPLICATION

This application claims priority to and the benefit of Korean Patent Application No. 10-2012-0140586 filed in the Korean Intellectual Property Office on Dec. 5, 2012, the entire contents of which are incorporated herein by reference.

BACKGROUND (a) Field of the Invention

The present invention relates to a method and apparatus for providing augmented reality. More particularly, the present invention relates to a method and apparatus that detect a marker and display information within an augmented reality environment.

(b) Description of the Related Art

Augmented reality is virtual reality technology that illustrates one image by adding virtual information to a real world image viewed by a user. This type of augmented reality is used in many fields such as an education, a game, and an advertisement. To display virtual information, augmented reality detects a material of a real world or uses a marker having special information. Augmented reality provides an effect in which a virtual material exists in a real world by synthesizing virtual information at a position of a detected object and a marker. However, such a method depends on a position of a marker or a material within an image. That is, existing technology only represents information at corresponding position when detecting a marker.

Further, when augmented reality is applied to a vehicle, a detected marker is represented at a location on a traveling route and thus a driver's visual field is disturbed. Particularly, when a large amount of information is to be represented on a screen, due to virtual information that is represented in a synthesized image, visual field security necessary when a user acquires information of a real world may be limited. For example, when a vehicle stops at an intersection and a front building is a point of interest (POI) and a marker is displayed at the front building, a signal light may be covered by the marker. In this case, the driver should turn off POI information or forcibly move the marker to another location. In this way, when the position is manually set, the driver's concentration while traveling a vehicle may be distributed.

The above information disclosed in this section is only for enhancement of understanding of the background of the invention and therefore it may contain information that does not form the prior art that is already known in this country to a person of ordinary skill in the art.

SUMMARY

The present invention provides a method and apparatus for providing augmented reality having advantages of displaying virtual information by automatically searching for a position at which an information amount is minimized based on a position to allow a driver to secure a visual field and by analyzing an information amount based on a position within a screen by analyzing an on-the-spot image input to an imaging device (e.g., a camera).

An exemplary embodiment of the present invention provides a method of providing an augmented reality of an augmented reality providing apparatus mounted within a vehicle including: matching, by a controller on the augmented reality providing apparatus, a head up display area of a windshield and an input image; determining, by the controller, an area in which an information amount is a minimum in the matched image as a position of a display window to display virtual information; and outputting, by the controller, virtual information at the determined position.

The determining, by the controller, an area may include determining whether a marker that is related to the virtual information is included in the matched image; dividing, when a marker that is related to the virtual information is included in the matched image, an area in which virtual information may be displayed in the matched image into a plurality of sub-blocks; calculating an information amount based on the plurality of sub-blocks; searching for a position at which the information amount is a minimum in the plurality of sub-blocks; and determining the position at which the information amount is a minimum as a position of the display window.

The calculating, by the controller, an information amount may include acquiring included edges based on the plurality of sub-blocks; counting the number of the edges; calculating an average distance based on the plurality of sub-blocks; normalizing the number of the edges; and calculating an information amount based on the sub-block using the calculated average distance and the number of the normalized edges.

The searching, by the controller, for a position may include generating an integral image based on the information amount; and searching for a position at which an information amount is a first minimum amount using a window size as a search unit in the integral image.

The outputting, by the controller, of virtual information may include outputting, when an already output virtual information display window exists at the position at which an information amount is the first minimum amount, virtual information at a position at which an information amount is a second minimum amount; determining, when an already output virtual information display window exists at the position at which an information amount is the second minimum amount, whether to output the virtual information display window according to a priority of previously defined display information; determining, whether output space exists at the determined position; outputting, when output space exists, a virtual information display window according to the priority at the output space; and searching for, when output space does not exist, a periphery and outputting a virtual information display window according to the priority on an already output virtual information display window in which a priority is substantially low in an area in which an information amount is a minimum.

The outputting, by the controller, a virtual information display window according to the priority on an already output virtual information display window may include determining whether an 'OFF' flag is listed at the overwrite field in the area in which an information amount is a minimum; and outputting, when an 'OFF' flag is not listed at the overwrite field, a virtual information display window according to the priority on an already output virtual information display window in which a priority is substantially low in an area in which an information amount is a minimum.

Another embodiment of the present invention provides an augmented reality providing apparatus that is mounted within a vehicle including: an image input unit that photographs an image positioned at a front side of a driver; an image matching unit that matches an input image photographed by the image input unit and a head up display area of a windshield; a recognition unit that determines whether a marker exists at an image matched by the matching unit; an analysis unit that determines an area in which an information amount is a minimum in the matched image as a position of a display window to display virtual information that corresponds to the marker, when the marker exists; and a display unit that outputs an augmented reality screen in which the image matching unit displays virtual information at the determined position.

The analysis unit may divide an area in which virtual information may be displayed in the matched image into a plurality of sub-blocks, calculate an information amount based on the plurality of sub-blocks, and determine a position at which the information amount is a minimum in the plurality of sub-blocks as a position to display the virtual information. In addition, the analysis unit may normalize the number of included edges based on the plurality of sub-block, calculate an information amount based on the sub-block together with the sub-block average distance, and search for a position at which an information amount is a first minimum using a size of a window as a search unit in a generated integral image based on the information amount.

Furthermore, the analysis unit may output virtual information at a position at which an information amount is a second minimum, when an already output virtual information display window exists at the position at which an information amount is the first minimum, determine whether to output a display window according to a priority of previously defined display information, when an already output virtual information display window exists at the position at which an information amount is the second minimum, and search for a periphery, when output space does not exist, and output a display window according to the priority on an already output virtual information display window having a substantially low priority in an area in which an information amount is a minimum.

According to an exemplary embodiment of the present invention, by displaying virtual information at a position at which an information amount is a minimum, a limited sight resource may be efficiently used, and unnecessary information may be naturally removed and thus manipulation convenience may be improved. In addition, by automatically selecting a marker information display position, manipulation convenience may be improved. Further, a maximum information amount may be provided to a driver using analysis of an information amount. In this way, a conventional problem that a visual field for obtaining information of a real world is covered when embodying augmented reality may be solved, and a driver's safety may be enhanced through security of a visual field.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following detailed description, only exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising," will be understood to imply the inclusion of stated elements but not the exclusion of any other elements. In addition, the term "-er" described in the specification mean units for processing at least one function and operation and can be implemented by hardware components or software components and combinations thereof.

Hereinafter, a method and apparatus for providing augmented reality according to an exemplary embodiment of the present invention will be described in detail with reference to the drawings.

Figure 1:
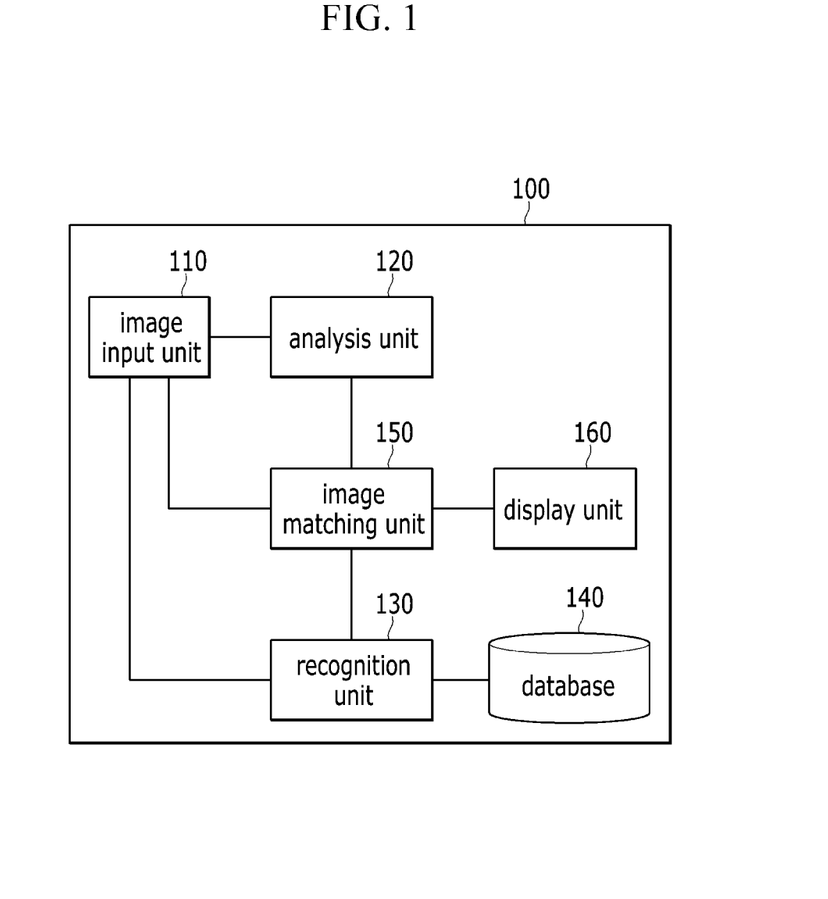
FIG. 1 is an exemplary block diagram illustrating a configuration of an augmented reality providing apparatus according to an exemplary embodiment of the present invention.
Figure 2:
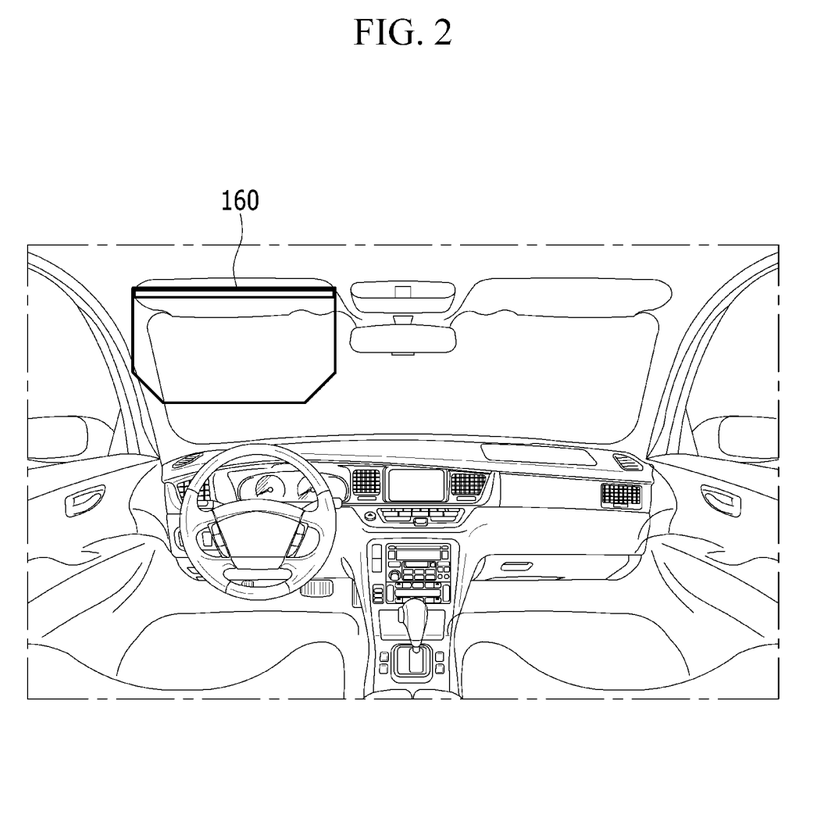
FIG. 2 is an exemplary schematic diagram illustrating an augmented reality providing apparatus that is installed within a vehicle according to an exemplary embodiment of the present invention.
Figure 3:
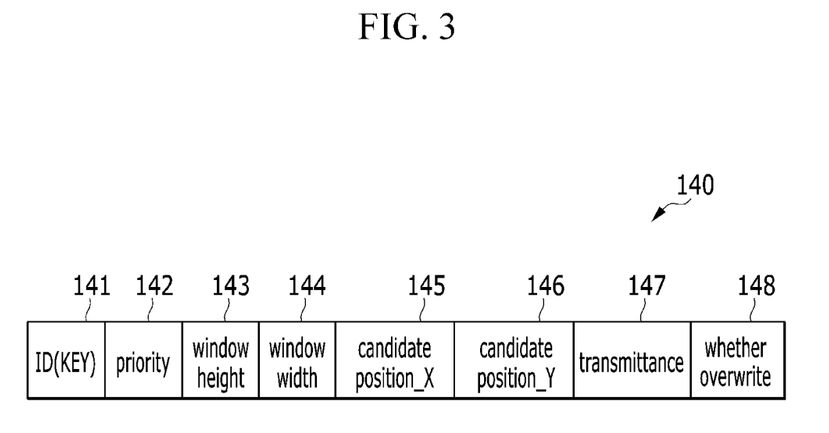
FIG. 3 is an exemplary schematic diagram of a database of FIG. 1 according to an exemplary embodiment of the present invention.

FIG. 1 is an exemplary block diagram illustrating a configuration of an augmented reality providing apparatus according to an exemplary embodiment of the present invention, FIG. 2 is an exemplary schematic diagram illustrating an augmented reality providing apparatus installed within a vehicle according to an exemplary embodiment of the present invention, and FIG. 3 is an exemplary schematic diagram of a database of FIG. 1.

Specifically, an augmented reality providing apparatus 100 may be mounted within a vehicle and embodies an augmented reality image. The augmented reality providing apparatus 100 may be configured to automatically detect an area having a substantially small information amount in a driver's visual field using an imaging device (e.g., a camera, a video camera, etc.), represents information of a marker at a corresponding position, and thus efficiently represents information without disturbing the driver's visual field.

Referring to FIG. 1, the augmented reality providing apparatus 100 may include a plurality of unit executed by a controller. The plurality of units may include: an image input unit 110, an analysis unit 120, a recognition unit 130, a database 140, an image matching unit 150, and a display unit 160. The image input unit 110 may be configured to obtain an image photographed by an imaging device (e.g., a camera). The image input unit 110 may be configured to track a driver's sight line direction and capture a front image.

The analysis unit 120 may be configured to analyze an input image in which the image input unit 110 captures and calculates an information amount based on an area. The analysis unit 120 may be configured to calculate an information amount of an input image using an area position, a color, a distance, an amount of an edge and a corner, and a user weight value of the input image. In particular, the display of an individual image or event may have a priority, and a display message of the largest value in a combination of a priority may be represented. A priority of such a display message may be defined by Table 1.

TABLE 1

| Order | Display message |
|---|---|
| 1 | System warning lamp (engine, airbag, brake, tire pressure, fuel, collision) |
| 2 | Pedestrian, wild animal, obstacle |
| 3 | Smart cruise control (SCC) information |
| 4 | Lane departure warning system (LDWS) information |
| 5 | Front, side, rear camera images |
| 6 | Navigation information (left turn, right turn, lane change information) |
| 7 | Entertainment information (communication, music) |

The recognition unit 130 may be configured to determine whether marker information to display exists within an input image based on a size of a width and length area and a ratio and emphasis within the image. In particular, marker information may indicate for example, a signpost and a building. In particular, the recognition unit 130 may be configured to determine whether marker information to display exists within an input image, to output information at a substantially accurate position from a driver's visual point since a data output area may be calculated using an input image. The recognition unit 130 may be configured to determine marker information by using information related to a marker stored in the database 140. Further, the database 140 may be configured to store information used when the analysis unit 120 analyzes and may be embodied, as shown in FIG. 3.

Referring to FIG. 3, the database 140 may be set with a plurality of fields in which each flag may be set. In other words, the plurality of fields may include an ID KEY field 141 in which intrinsic information may be recorded, a priority field 142 in which priority information of Table 1 may be recorded, a window height field 143 and a window width field 144 of a display window (or display message) that displays virtual information, a candidate position_X field 145 that the analysis unit 120 may be configured to analyze, a candidate position_Y field 146 that the analysis unit 120 may be configured to analyze, a transmittance field 147, and a field 148 that records overwrite.

The image matching unit 150 may be configured to match an area of a windshield head up display (hereinafter, referred to as an "HUD") that is displayed to the driver using the driver's sight line information and an input image. The image matching unit 150 may be configured to synthesize virtual information that embodies augmented reality to the input image. In other words, the image matching unit 150 may be configured to output an augmented reality screen according to marker information in which the recognition unit 130 determines at a position at which the analysis unit 120 determines to the display unit 160.

The display unit 160 may be configured to output an augmented reality screen in which matched virtual information may be displayed at a position of a synthesized image in which the image matching unit 150 generates an actual image. The display unit 160 may be formed in a transparent display and may be configured to transmit light that is entered through a front glass window and may be configured to transfer the light toward the driver. As shown in FIG. 2, to simultaneously show an actual view through a front glass window and virtual information to the driver, the display unit 160 may be positioned at a front surface in the driver's sight line direction.

Figure 4:
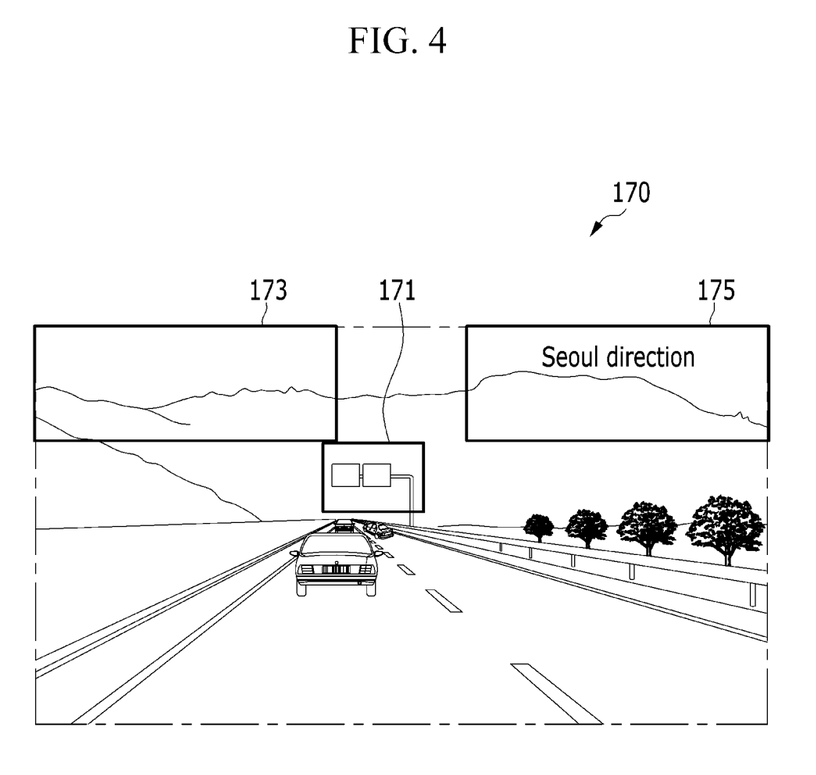
FIG. 4 illustrates an exemplary augmented reality screen according to an exemplary embodiment of the present invention.

FIG. 4 illustrates an exemplary augmented reality screen according to an exemplary embodiment of the present invention. Referring to FIG. 4, an exemplary augmented reality screen 170 may include a marker information display area 171 and areas 173 and 175 having a substantially small information amount (e.g., the display areas are substantially smaller than other display areas). In particular, in the area 175 in which an information amount is a minimum, virtual information that corresponds to marker information may be displayed.

Hereinafter, operation of the augmented reality providing apparatus 100 will be described.

Figure 5:
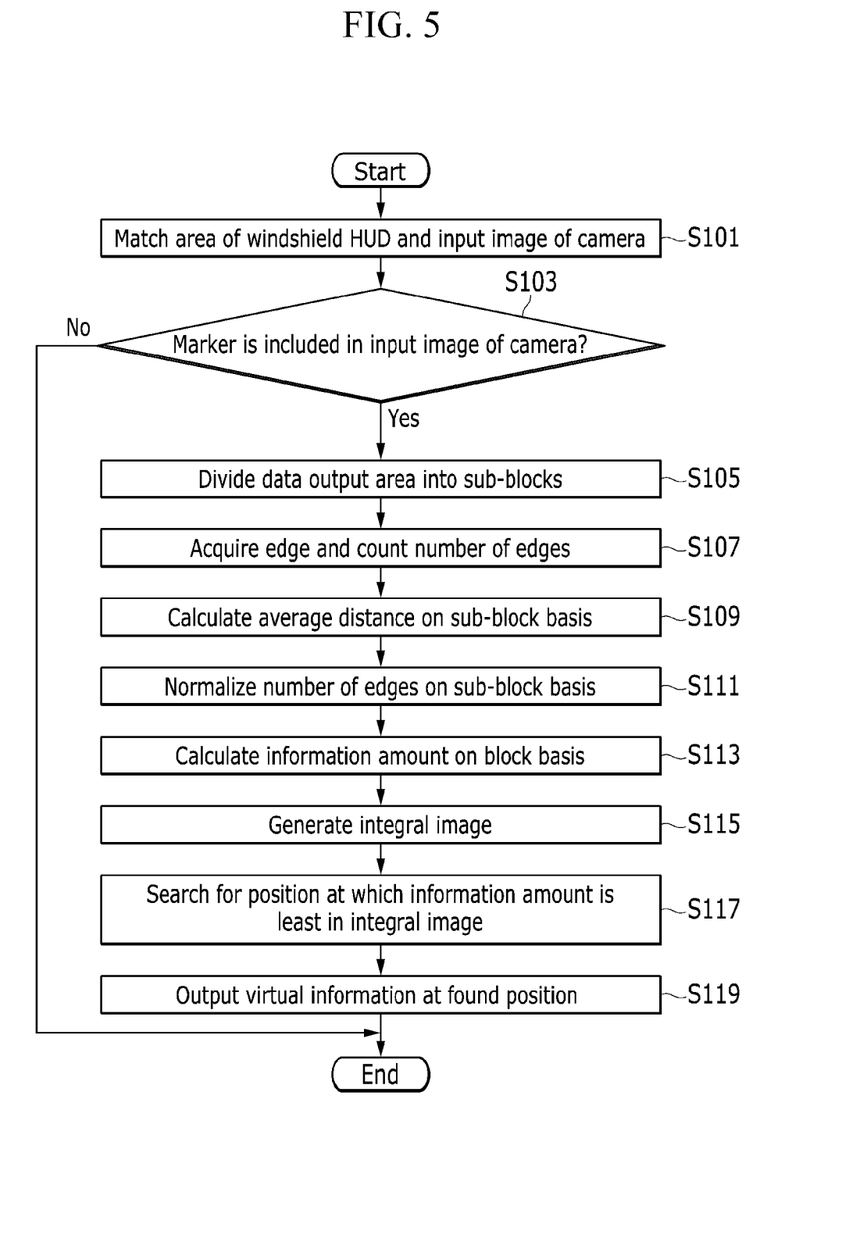
FIG. 5 is an exemplary flowchart illustrating a method of providing augmented reality according to an exemplary embodiment of the present invention.
Figure 6:
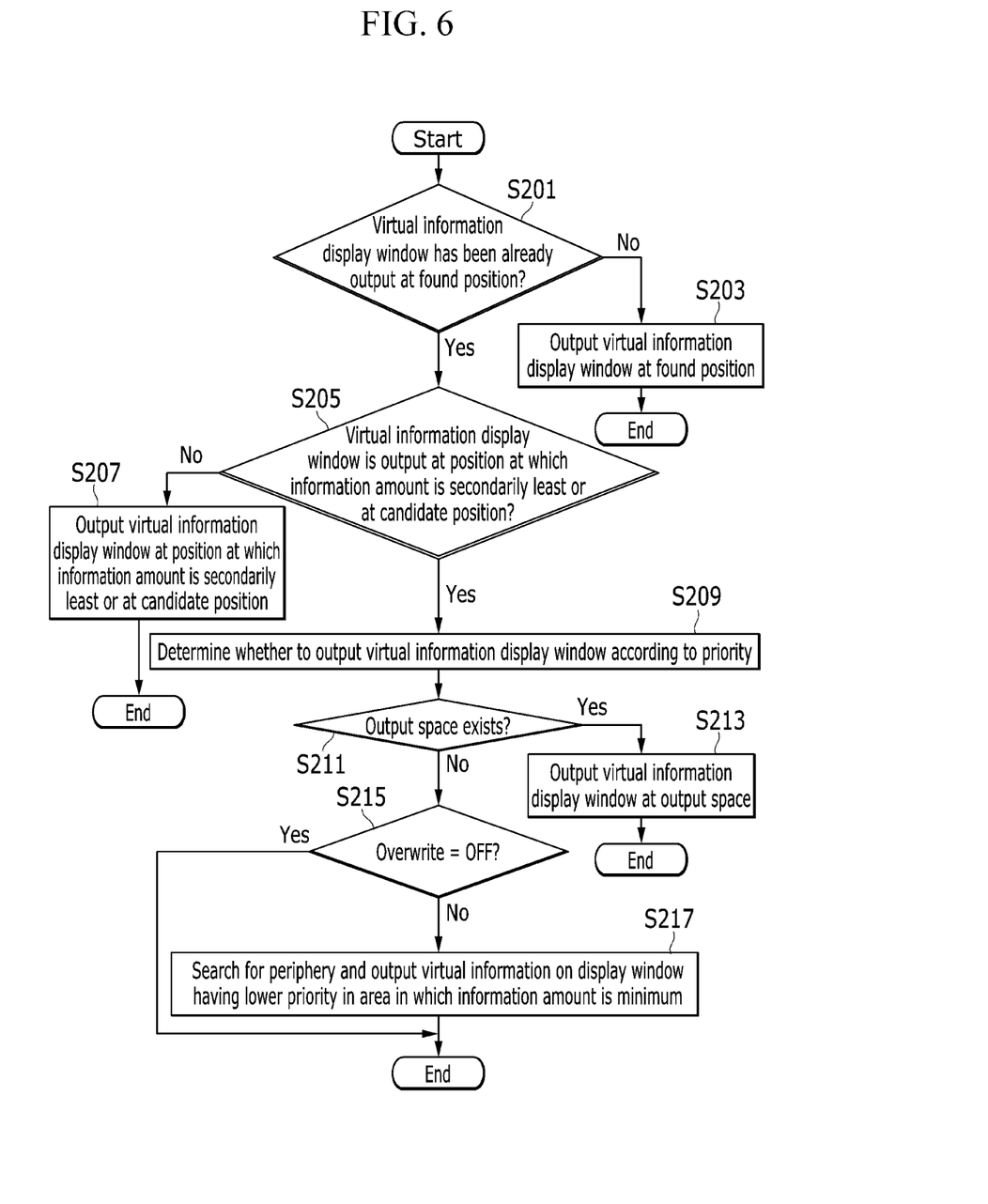
FIG. 6 is an exemplary flowchart illustrating a method of providing augmented reality according to another exemplary embodiment of the present invention.
Figure 7:
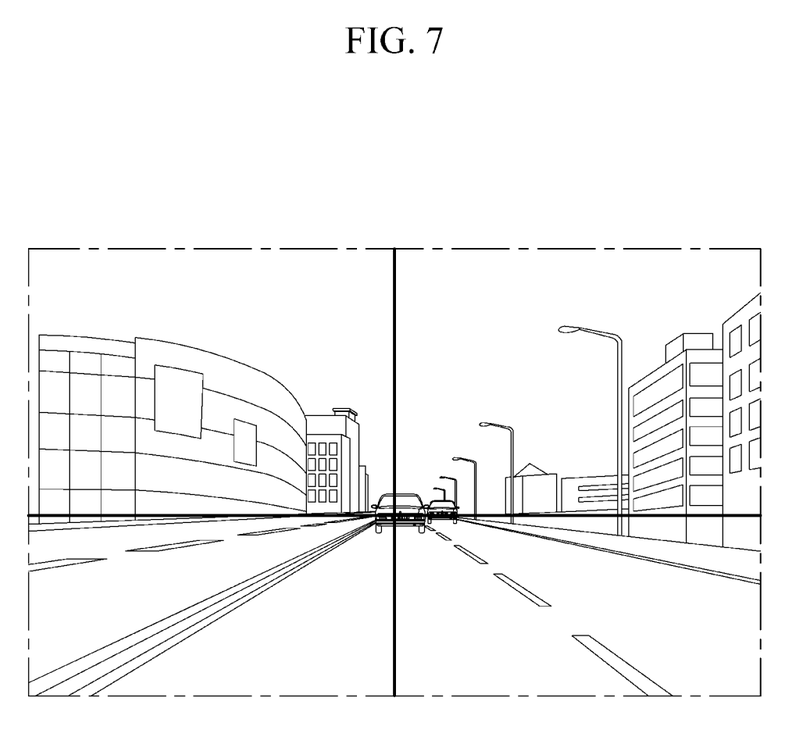
FIG. 7 illustrates an exemplary HUD area of a windshield viewed in a driver's visual field according to an exemplary embodiment of the present invention.
Figure 8:
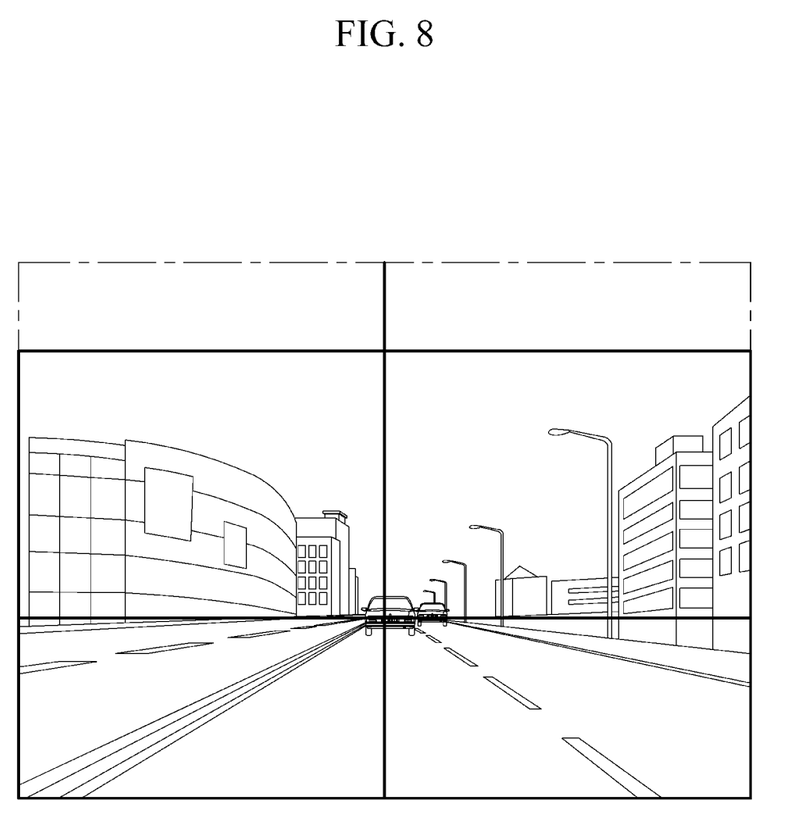
FIG. 8 illustrates an exemplary input image acquired via an imaging device according to an exemplary embodiment of the present invention.
Figure 9:
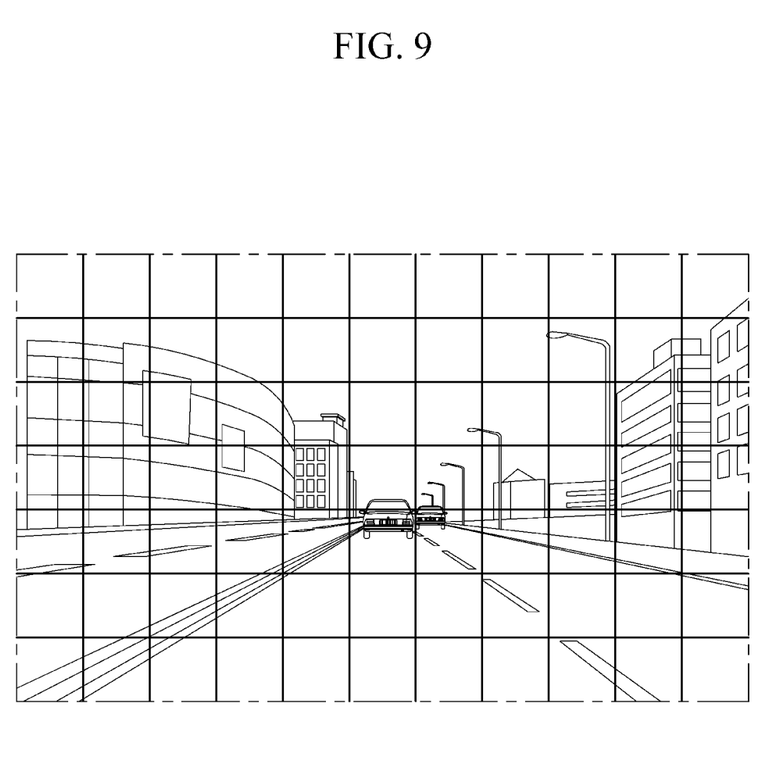
FIG. 9 illustrates an exemplary image divided into a sub-block according to an exemplary embodiment of the present invention.
Figure 10:
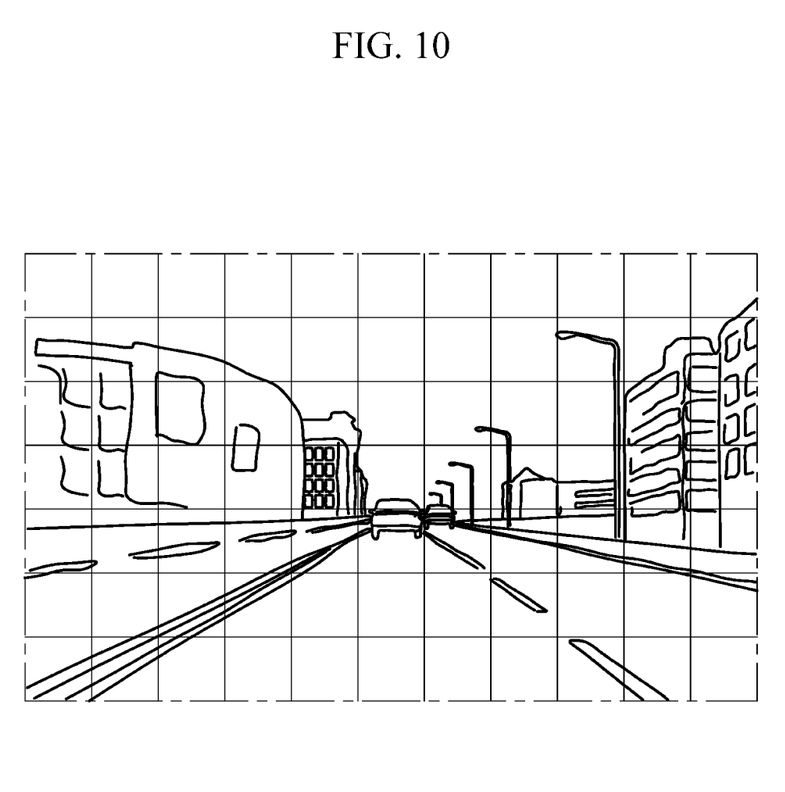
FIG. 10 illustrates an exemplary edge and distance calculation based on a sub-block according to an exemplary embodiment of the present invention.
Figure 11:
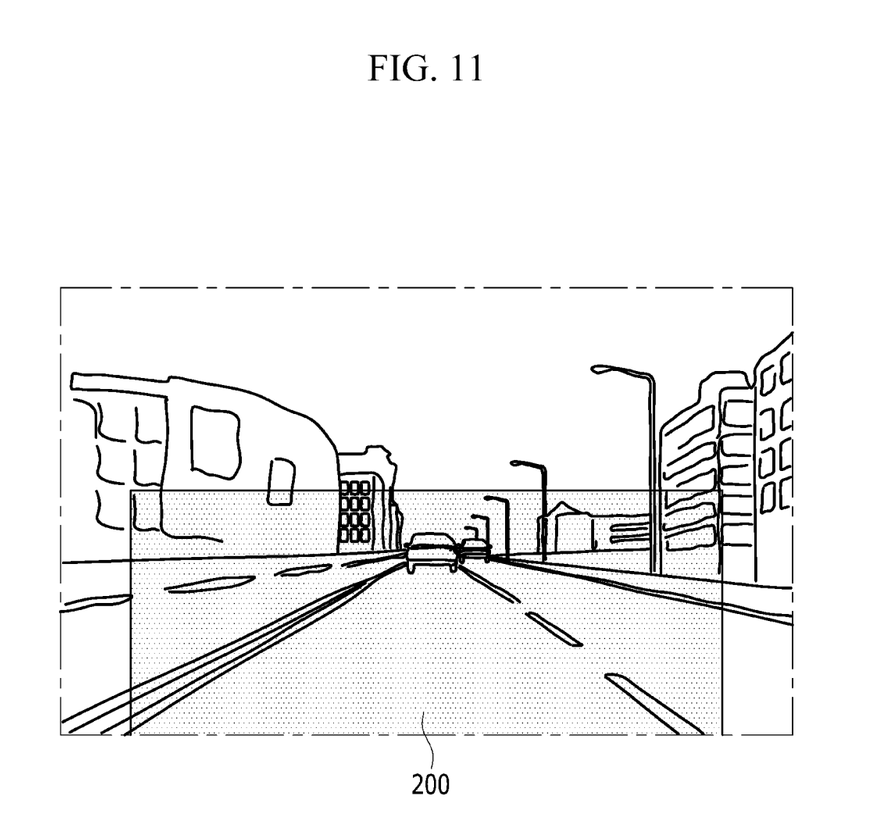
FIG. 11 illustrates an exemplary road area random masking area for a driver's visual field security according to an exemplary embodiment of the present invention.
Figure 12:
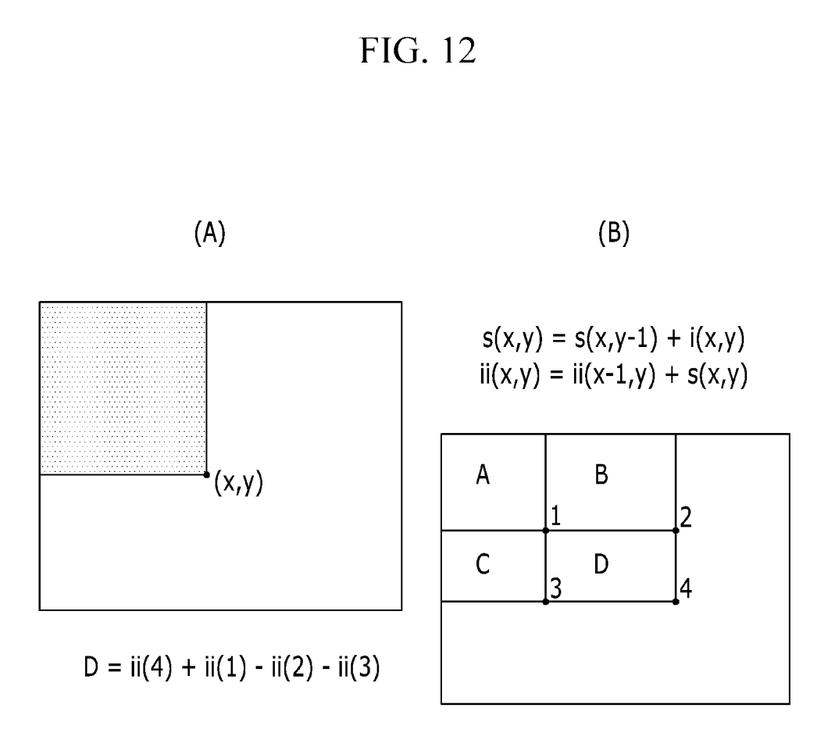
FIG. 12 illustrates an exemplary integral image according to an exemplary embodiment of the present invention.

FIG. 5 is an exemplary flowchart illustrating a method of providing augmented reality according to an exemplary embodiment of the present invention, FIG. 6 is an exemplary flowchart illustrating a method of providing augmented reality according to another exemplary embodiment of the present invention, FIG. 7 illustrates an exemplary HUD area of a windshield that is viewed in a driver's visual field according to an exemplary embodiment of the present invention, FIG. 8 illustrates an exemplary input image that is acquired via an imaging device according to an exemplary embodiment of the present invention, FIG. 9 illustrates an exemplary image that is divided into a sub-block according to an exemplary embodiment of the present invention, FIG. 10 illustrates an exemplary edge and distance calculation based on a sub-block according to an exemplary embodiment of the present invention, FIG. 11 illustrates an exemplary road area random masking area for a driver's visual field security according to an exemplary embodiment of the present invention, and FIG. 12 illustrates an exemplary integral image according to an exemplary embodiment of the present invention. In particular, the same elements in a configuration of FIGS. 1-4 are denoted by the same reference numerals.

First, referring to FIG. 5, the image matching unit 150 may be configured to match an area of a windshield HUD that is displayed to the driver using the driver's sight line information and an input image acquired by the image input unit 110 (S101). In particular, the area of the windshield HUD is shown in FIG. 7 and is shown like FIG. 8 upon matching.

The recognition unit 130 may be configured to determine whether marker information to display is included in an input image that is input by the image input unit 110 (S103). When marker information is included in the input image, the analysis unit 120 may be configured to divide the image that is matched at step S101 into sub-blocks of a determined size, as shown in FIG. 9 (S105). In particular, the size of the sub-block may be variously selected.

Next, the analysis unit 120 may be configured to form each sub-block that is divided at step S105 into a binary code, as shown in FIG. 10, acquire an edge using an image processing, and count the number of edges per block (S 107). In addition, the analysis unit 120 may be configured to calculate an average distance based on a sub-block, using distance information obtained using a ladar sensor (not shown) (S109). In particular, the ladar sensor may be configured to acquire a substantially precise three-dimensional distance using a laser signal. It may be assumed that distance information obtained using the ladar sensor (not shown) may have been previously acquired.

Furthermore, the analysis unit 120 may be configured to normalize the number of edges based on a sub-block (S111). In other words, the analysis unit 120 may be configured to acquire and normalize the reciprocal number of a distance value based on a sub-block. Next, the analysis unit 120 may be configured to calculate an information amount based on a block like Equation 1 using a distance value and an edge value based on a sub-block that is normalized at step S111 (S113).

$$I_b = (a \times I_{edge}) + (b \times I_{dist}) + (c \times I_{mask}) \quad \text{Equation 1}$$

wherein $I_b$ is an information amount, $I_{edge}$ is an edge amount of a block, $I_{dist}$ is a distance information amount of a block, $I_{mask}$ is a masking area, and a, b, c are coefficients.

Additionally, the analysis unit 120 may be configured to generate an integral image, as shown in FIG. 12A based on an information amount calculated at step S113 (S115). In particular, a size of a display window that displays virtual information may use a size of window that is stored at the database 140. In other words, a size of a display window refers to a flag that is stored at the window height field 143 and the window width field 144. Further, when a size of the display window is not stored at the database 140, a size of a rendered window may be used.

Furthermore, as shown in FIG. 12B, the analysis unit 120 may be configured to search for a position at which an information amount is a first minimum (e.g., a smallest amount or a first least amount) using a window size as a search unit in an integral image (S117). The display unit 160 may be configured to output a virtual information display window at a position having the first minimum information amount in which the analysis unit 120 is found at step S117 (S119). In this case, step S119 may be subdivided, as shown in FIG. 6.

Referring to FIG. 6, the analysis unit 120 may be configured to determine whether a virtual information display window has already been output at a found position (S201). When a virtual information display window has not already been output at a found position, the analysis unit 120 may be configured to output a virtual information display window at the found position (S203). When a virtual information display window has already been output at a found position, the analysis unit 120 may be configured to determine whether a virtual information display window has been output at a position at which an information amount is a second minimum (e.g., a second smallest amount or a second least amount) or at a position that is listed at the candidate position fields 145 and 146 in which the analysis unit 120 extracts and stores (S205) information.

Additionally, when a virtual information display window has not been output, the analysis unit 120 may be configured to output a virtual information display window at a position at which an information amount the second minimum or at a candidate position (S207). When a virtual information display window has been output, the analysis unit 120 may be configured to determine whether to output a virtual information display window according to priority information of Table 1 that is listed at the priority field 142 that is stored at the database 140 (S209).

In particular, the analysis unit 120 may be configured to determine whether output space exists at the determined position (S211). When output space exists, the analysis unit 120 may be configured to output a virtual information display window at the output space (S213). When output space does not exist, the analysis unit 120 may be configured to determine whether overwrite that is listed at the overwrite field 148 that is stored at the database 140 is available (S215). In other words, the analysis unit 120 may be configured to determine whether an 'OFF' flag is listed at the overwrite field 148.

Specifically, when an 'OFF' flag is not listed at the overwrite field 148, the analysis unit 120 may be configured to output a virtual information on an already output virtual information display window having a priority lower than that of a virtual information display window to output (S217). In particular, the analysis unit 120 may be configured to search for a periphery of output space and display virtual information in an area in which an information amount is a minimum. When an 'OFF' flag is listed at the overwrite field 148, even when an already output virtual information display window has a substantially low priority (e.g., below a predetermined threshold), virtual information may not be displayed on the already output virtual information display window and thus step may be terminated. In particular, a position at which an 'OFF' flag is listed at the overwrite field 148 may be a randomly masked area 200, i.e., the driver's front visual field area, as shown in FIG. 11.

The foregoing exemplary embodiment of the present invention may be not only embodied through an apparatus and/or method but also embodied through a program that executes a function corresponding to a configuration of the exemplary embodiment of the present invention or through a recording medium on which the program is recorded.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

What is claimed is:

1. A method of providing augmented reality of an augmented reality providing apparatus mounted within a vehicle, the method comprising:
   matching, by a controller, a head up display area of a windshield and an input image;
   determining, by the controller, an area in which an information amount is a minimum in the matched image as a position of a display window to display virtual information; and
   outputting, by the controller, virtual information at the determined position,
   wherein:
   (1) the determining of an area comprises:
   determining, by the controller, whether a marker related to the virtual information is included in the matched image;
   when the marker is included in the matched image, dividing, by the controller, an area in which virtual information may be displayed in the matched image into a plurality of sub-blocks;
   calculating, by the controller, the information amount based on the plurality of sub-blocks;
   searching, by the controller, for a position at which the information amount is the minimum based on the plurality of sub-blocks; and
   determining, by the controller, the position at which the information amount is the minimum as a position of the display window; and
   (2) the calculating of an information amount comprises:
   acquiring, by the controller, included edges based on the plurality of sub-blocks;
   counting, by the controller, the number of the edges;
   calculating, by the controller, an average distance based on the plurality of sub-blocks;
   normalizing, by the controller, the number of the edges; and
   calculating, by the controller, the information amount based on the sub-block using the calculated average distance and the number of the normalized edges.

2. The method of claim 1, wherein the searching of for a position includes:
   generating, by the controller, an integral image based on the information amount; and
   searching, by the controller, for a position at which the information amount is a first least amount using a window size as a search unit in the integral image.

3. The method of claim 2; wherein the outputting of virtual information includes:
   when an already output virtual information display window exists at the position at which the information amount is the first least amount, outputting, by the controller, virtual information at a position at which an information amount is a second least amount;
   when the already output virtual information display window exists at the position at which the information amount is the second least amount, determining, by the controller, whether to output the virtual information display window according to a priority of previously defined display information;
   determining, by the controller, whether output space exists at the determined position;
   when output space exists, outputting, by the controller, the virtual information display window according to the priority at the output space; and
   when output space does not exist, searching for, by the controller, a periphery and outputting the virtual information display window according to the priority on the already output virtual information display window in which the priority is below a predetermined threshold in an area in which the information amount is the minimum.

4. The method of claim 3, wherein the outputting the virtual information display window according to the priority on the already output virtual information display window includes:
   determining, by the controller, whether an 'OFF' flag is listed in the overwrite field in the area in which the information amount is the minimum; and
   when the 'OFF' flag is not listed in the overwrite field, outputting, by the controller, a virtual information display window according to the priority on the already output virtual information display window in which the priority is below the predetermined threshold in the area in which the information amount is the minimum.

5. An augmented reality providing apparatus mounted within a vehicle, comprising:
   a controller configured to:
   capture an input image positioned at a front side of a driver using an imaging device; match the input image and a head up display area of a windshield;
   determine whether a marker is detected in a matched image;
   determine an area in which an information amount is a minimum in the matched image as a position of a display window to display virtual information that corresponds to the marker, when the marker is detected; and
   output an augmented reality screen in which virtual information is displayed at the determined position,
   wherein the controller is further configured to:
   divide an area in which virtual information is displayed in the matched image into a plurality of sub-blocks;
   calculate the information amount based on the plurality of sub-blocks;
   determine a position at which the information amount is the minimum in the plurality of sub-blocks as the position to display the virtual information;
   normalize a number of edges based on the plurality of sub-block;
   calculate the information amount based on the sub-block together with the sub-block average distance and the number of the normalized edges; and search for the position at which the information amount is a first least amount using a size of a window as a search unit in a generated integral image based on the information amount.

6. The augmented reality providing apparatus of claim 5, wherein the controller is further configured to:
   output virtual information at the position at which the information amount is a second least amount, when an already output virtual information display window exists at the position at which the information amount is the first least amount;
   determine whether to output the virtual information display window according to a priori of previously defined display information, when the already output virtual information display window exists at the position at which the information amount is the second least amount; and
   search for a periphery, when output space does not exist, and output the virtual information display window according to the priority on the already output virtual information display window having a priority below a predetermined threshold in the area in which the information amount is the minimum.

7. A non-transitory computer readable medium containing program instructions executed by a controller, the computer readable medium comprising:
   program instructions that control an imaging device to capture an input image positioned at a front side of a driver;
   program instructions that match the input image and a head up display area of a windshield;
   program instructions that determine whether a marker is detected in a matched image;
   program instructions that determine an area in which an information amount is a minimum in the matched image as a position of a display window to display virtual information that corresponds to the marker, when the marker is detected;
   program instructions that output an augmented reality screen in which virtual information is displayed at the determined position;
   program instructions that divide an area in which virtual information is displayed in the matched image into a plurality of sub-blocks;
   program instructions that calculate the information amount based on the plurality of sub-blocks; and
   program instructions that determine a position at which the information amount is the minimum in the plurality of sub-blocks as the position to display the virtual information;
   program instructions that normalize a number of edges based on the plurality of sub-block;
   program instructions that calculate the information amount based on the sub-block together with the sub-block average distance and the number of the normalized edges; and
   program instructions that search for the position at which the information amount is a first least amount using a size of a window as a search unit in a generated integral image based on the information amount.

8. The non-transitory computer readable medium of claim 7, further comprising:
   program instructions that output virtual information at the position at which the information amount is a second least amount, when an already output virtual information display window exists at the position at which the information amount is the first least amount;
   program instructions that determine whether to output the virtual information display window according to a priority of previously defined display information, when the already output virtual information display window exists at the position at which the information amount is the second least amount; and
   program instructions that search for a periphery, when output space does not exist, and output the virtual information display window according to the priority on the already output virtual information display window having a priority below a predetermined threshold in the area in which the information amount is the minimum.

* * * * *